Dec. 10, 1946.  W. C. SHIRK ET AL  2,412,297
LOADING MACHINE
Filed Sept. 14, 1945  3 Sheets-Sheet 1
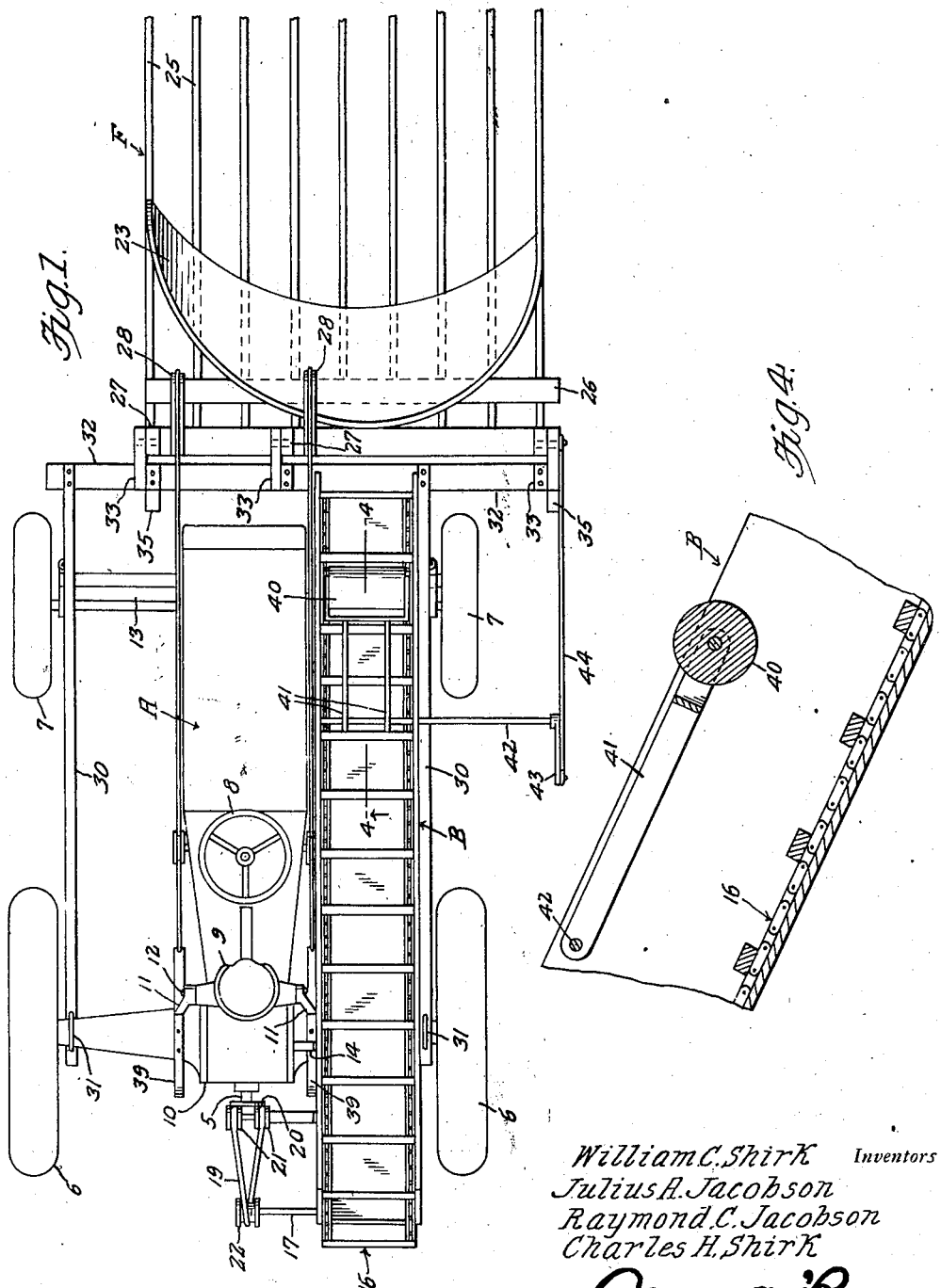
William C. Shirk  Inventors
Julius A. Jacobson
Raymond C. Jacobson
Charles H. Shirk
By Clarence A. O'Brien
and Harvey B. Jacobson
Attorneys Dec. 10, 1946.  W. C. SHIRK ET AL  2,412,297
LOADING MACHINE
Filed Sept. 14, 1945  3 Sheets-Sheet 2
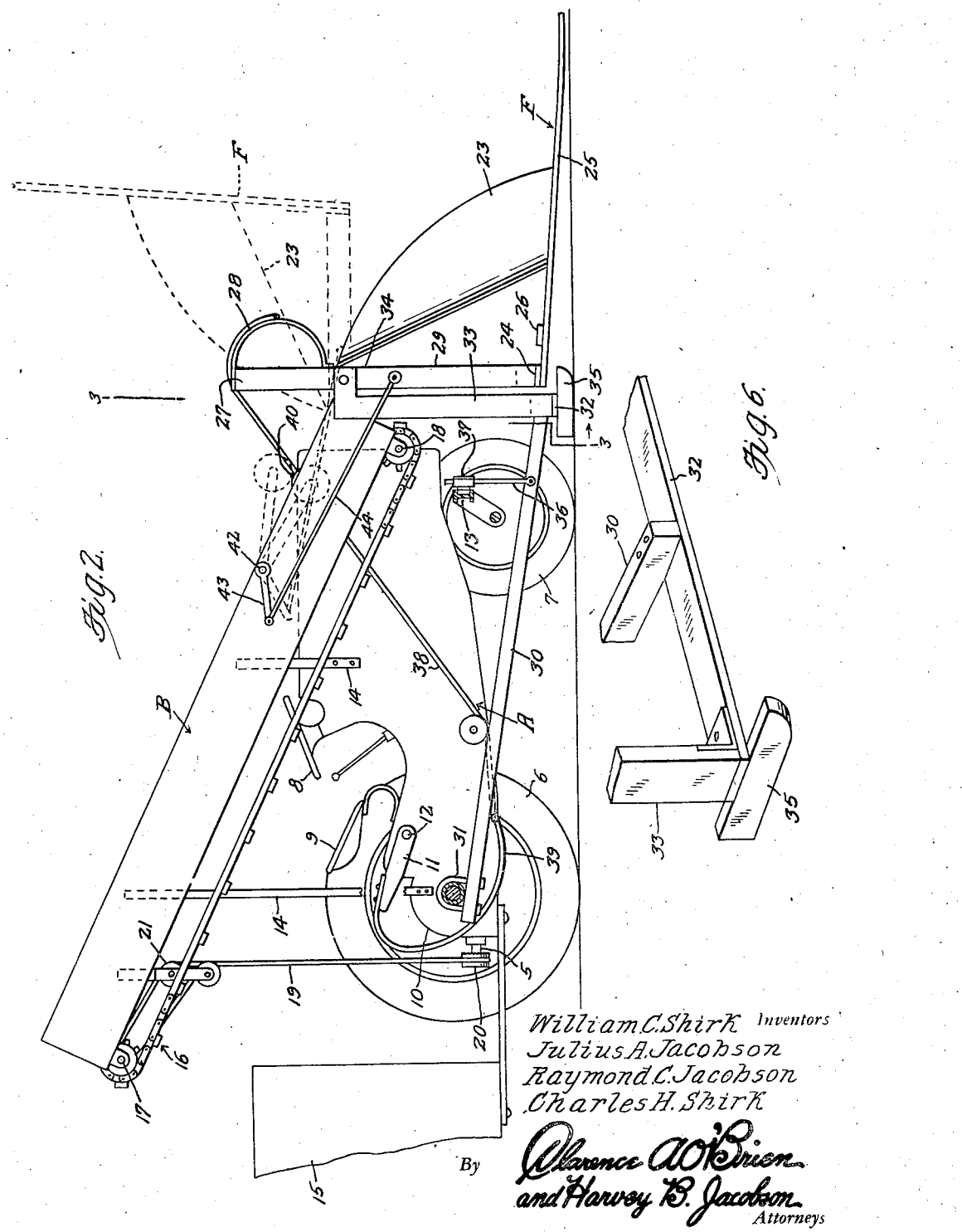
Inventors
William C. Shirk
Julius A. Jacobson
Raymond C. Jacobson
Charles H. Shirk Dec. 10, 1946.  W. C. SHIRK ET AL  2,412,297
LOADING MACHINE
Filed Sept. 14, 1945  3 Sheets-Sheet 3
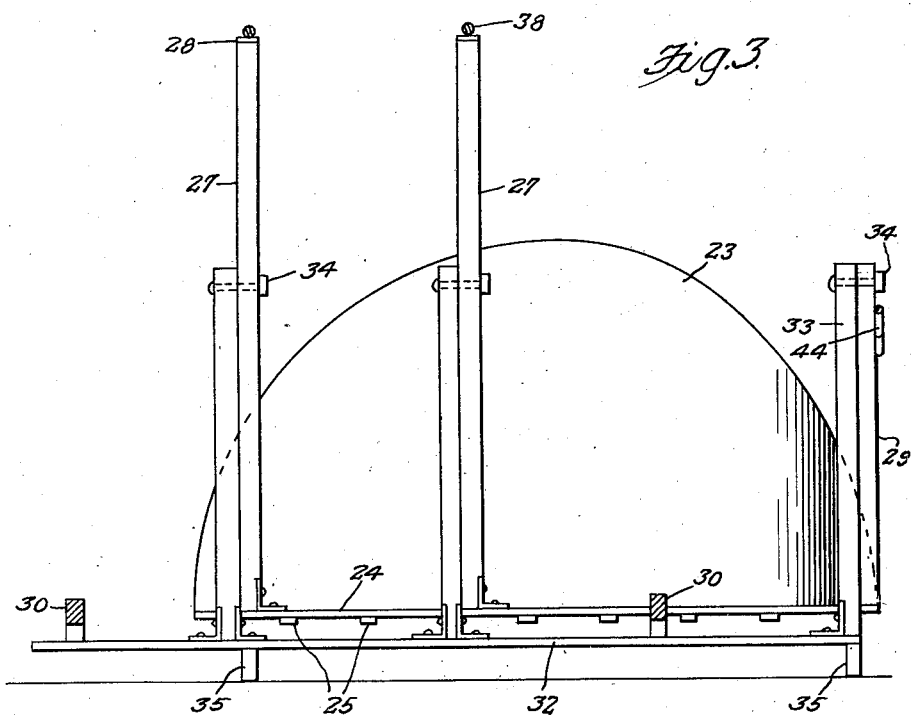
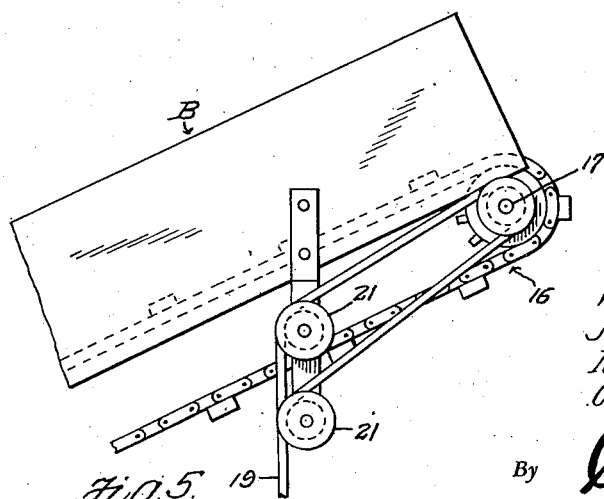
William C. Shirk  Inventors
Julius A. Jacobson
Raymond C. Jacobson
Charles H. Shirk
By Clarence A. O'Brien
and Harvey B. Jacobson
Attorneys Patented Dec. 10, 1946

2,412,297

UNITED STATES PATENT OFFICE 2,412,297

LOADING MACHINE

William C. Shirk, Sioux Falls, Julius A. Jacobson and Raymond C. Jacobson, Brandon, and Charles H. Shirk, Sioux Falls, S. Dak.

Application September 14, 1945, Serial No. 616,346

5 Claims. (Cl. 214—91)

This invention relates to improvements in loading machines especially designed for gathering shocks from the ground and conveying them to a truck or other receptacle at the rear of the machine, but capable of general use.

The primary object of the invention is to provide a machine of this character which is of simple and practical construction, and whose use will effect a great saving in time and labor.

More particularly, the present invention contemplates the provision of a material gathering and conveying apparatus mounted upon a conventional agricultural tractor having a hydraulic lift and rearwardly extending power take-off shaft, the gathering device being operatively connected to the lifting arms of the hydraulic lift, and the conveyor being operatively connected to the power take-off shaft.

A further object of the invention is to provide a machine of the above kind in which the gathering and conveying apparatus are so constructed and mounted with respect to the tractor that substantially unobstructed vision is provided for the operator of the tractor.

The exact nature of the present invention, as well as other objects and features thereof, will become apparent from the following description when considered in connection with the accompanying drawings, in which:

Figure 1 is a top plan view of a loading machine constructed in accordance with the present invention.

Figure 2 is a view thereof, partly in side elevation, and partly in section.

Figure 3 is an enlarged vertical transverse section taken substantially on line 3—3 of Figure 2.

Figure 4 is an enlarged fragmentary longitudinal section taken substantially on line 4—4 of Figure 1.

Figure 5 is a fragmentary side elevational view, showing the rear end portion of the conveyor and looking toward the side opposite to that seen in Figure 2, so as to more clearly reveal details of the driving means for the conveyor.

Figure 6 is a fragmentary perspective view showing a front portion of the vertically yieldable supporting frame for the material lifting or gathering fork.

Referring in detail to the drawings, we have shown our invention as applied to and used in combination with a conventional agricultural tractor A having a rearwardly extending power take-off shaft 5, driven rear traction wheels 6, front steering and supporting wheels 7 turned by actuation of a steering handle or wheel 8 in front of the driver's seat 9, a differential and rear axial housing assembly 10, and a hydraulic lift including rearwardly extending lift arms 11 fixed on a transverse power operated rock shaft 12. As is usual in this type of tractor, the wheels 6 and 7 are spaced a considerable distance from the sides of the body of the tractor, and the wheels 7 are mounted on the ends of a fixed front axle 13.

In accordance with the present invention, a conveyor B is rigidly mounted longitudinally of and upon the tractor, as at 14, in an elevated forwardly inclined position and between one side of the body of the tractor A and the adjacent wheels 6 and 7, the conveyor extending rearwardly and upwardly beyond the rear end of the tractor so that it will discharge into a truck or other receptacle 15 connected to or mounted at the rear of the machine. The conveyor or elevator B includes an endless conveying element 16 composed of spaced endless sprocket chains connected at the intervals by cross members or slats as is conventional in the conveyor art, said sprocket chains passing around sprockets provided respectively upon a head shaft 17 and a foot shaft 18. The conveyor B is thus located to one side of the driver seat 9 so that the driver occupying said seat will have substantially unobstructed vision ahead in operating the machine. The head shaft 17 is driven by a belt gearing from the power take-off shaft 5, which gearing includes an endless power transmission belt 19 passing around a pulley 20 secured on the shaft 5, idler pulleys 21 mounted upon and disposed at the inner side of the conveyor B, and a pulley 22 secured on an inwardly projecting end of the head shaft 17. As seen in Figures 1 and 2, the conveyor B projects slightly at the front end of the tractor in position to receive the material from a vertically swinging fork F which lifts the material from the ground and has a chute 23 mounted thereon near the back thereof for delivering the material rearwardly from the fork onto the forward end of the conveyor B.

The fork F includes a transverse bar 24 having a plurality of spaced tines 25 fixed to and projecting forwardly therefrom, said tines being preferably braced by a cross bar 26. Rigidly secured to and rising from the bar 24 at right angles to the tines 25 are spaced levers 27 having half sections 28 of pulleys fixed to the forward sides of the upper ends thereof. One lever 27 is arranged near but to the inner side of the longitudinal center of the bar 24, while the other lever 27 is arranged adjacent the inner end of said bar 24 as shown in Figure 3. An upright 29 is rigid with and projects upwardly from the outer end of the bar 24, said upright 29 being shorter than the levers 27.

A vertically yieldable supporting frame is provided for the lifting fork F, said frame including a pair of arms 30 disposed longitudinally of and at opposite sides of the tractor at the inner sides of the wheels 6 and 7, and respectively pivotally suspended at their rear ends by U-bolts 31 from the rear axle housings of the assembly 10, for vertical swinging movement. The arms 30 project slightly beyond the forward end of the tractor and are rigidly connected at their forward ends by a cross bar 32, one end portion of which projects laterally beyond the conveyor B and the adjacent wheel 7 of the tractor. A plurality of posts 33 are rigid with and rise from the cross bar 32, and the levers 27 are pivoted at 34 intermediate their ends for vertical swinging movement and to the upper ends of two of said posts 33. The upright 29 is pivoted at its upper end to the upper end of the remaining post 33, so that the fork F is mounted to swing vertically from the horizontal full line position of Figure 2 to the dotted line position thereof. Mounted on the underside of the cross bar 32 at opposite sides of the tractor are ground engaging runners 35 which ride over irregularities of the ground surface and cause the fork F to rise and fall as the supporting frame therefor yields vertically upon forward travel of the machine. This insures maintenance of the fork F out of engagement with the ground surface while supporting it in close proximity to the latter when in forwardly and downwardly swung gathering position as shown by full lines in Figure 2. In order to guide the fork supporting frame in its vertical yielding movements and to also brace the same against lateral strains or shifting, guide rods 36 are pivoted to and project upwardly from the arms 30 and slidably extend through guide sleeves 37 secured to the axle 13.

The lifting arms 11 of the hydraulic lift of the tractor are utilized to actuate the levers 27 so as to tilt the fork F upwardly and rearwardly to the dotted line dumping position of Figure 2. For this purpose, cables or equivalent flexible members 38 are provided, each of which has one end anchored to and extended around one of the pulley half sections 28 and its other end attached to a curved arm 39 which is fixed to each lifting arm 11 and is shaped to extend rearwardly and downwardly from the arm 11 and then forwardly under and beyond the rear axle housing of the assembly 10 as shown more clearly in Figure 2. The curved arms 39 are rigid and permit disposition of the cables 38 out of the way of the driver of the machine occupying the seat 9, said arms 39 acting as extensions of the lifting arms 11.

It will be noted that the chute 23 is rigid with the fork F and inclines forwardly and downwardly so that when the fork F is raised to the vertical dumping position indicated by dotted lines in Figure 2, said chute 23 is disposed to incline rearwardly and downwardly above and to a point adjacent the forward end of the conveyor B, whereby to effectively deliver the material from the fork onto the forward end of said conveyor.

Means is provided to insure effective tractive engagement of the endless conveying element 16 with the material after it is delivered from the chute 23 onto the forward end of conveyor B. As shown, this means comprises a transverse presser roller 40 arranged within the forward portion of the conveyor B above the upper flight of the endless conveying element 16 and carried by the forward ends of arms 41 which are pivoted at their rear ends upon a transverse rock shaft 42 journaled in the sides of the conveyor B. The shaft 42 projects beyond the outer side of the conveyor B and has a crank arm 43 on the projecting end thereof which is operatively connected by a rod or link 44 with the upright 29 at a point below the pivot 34 of the latter. The presser roller 40 is of course journaled between the arms 41, and the arrangement is such that when the fork F is swung upwardly to the dumping position, the presser roller 40 is raised so as to be out of the way of the material being delivered by the chute 23 onto the forward end of the conveyor. The arrangement is also such that after the material has been delivered onto the forward end of the conveyor and as the fork F is lowered to gathering position, roller 40 is lowered so as to contact the material and press it against the conveying element 16, thereby providing sufficient tractive engagement between the material and said conveying element 16 to positively insure immediate upward and rearward travel of the material with said conveying element. This prevents any possibility of slipping of the conveying element relative to the material and gravitation of the latter in a forward direction within the conveyor at the time of delivery of the material onto the conveyor from the chute 23.

In operation, the machine is driven forwardly and the material is received by the lifting fork and elevated and delivered onto the conveyor so that the latter will convey it upwardly and rearwardly and discharge the same into the truck or receptacle 15 at the rear of the machine. As is well known in the art, the actuation of the shaft 5 and the lifting arms 11 is under the convenient control of the driver of the tractor, so that actuation of the conveying element 16 and the lifting fork F may be caused or discontinued at will. When shocks are to be loaded they are usually placed in rows and in spaced relation, the same being successively gathered by the lifting fork F as the machine is driven forwardly from one shock to another by the driver of the machine. With the conveyor in operation, and upon reception of each shock by the fork F, the latter is swung upwardly to the dumping position shown by dotted lines in Figure 2, through the actuation of lifting arms 11. The shock is delivered by gravity from chute 23 onto the conveyor and the latter subsequently delivers the shock rearwardly and upwardly and discharges it into the receptacle or truck 15. The fork is then allowed to lower by gravity to gathering position as shown by full lines in Figure 2, whereupon the machine is propelled forwardly to the next shock. This operation is repeated until all of the shocks are gathered and loaded.

From the foregoing description, it is believed that the construction, operation and advantages of the present invention will be readily understood and appreciated by those skilled in the art. Minor changes may be made in details of construction, such as fall within the scope of the invention as claimed.

What we claim is:

1. In a material loading machine, the combination of a tractor having a rear power take-off shaft, an elevating conveyor mounted upon the tractor longitudinally of and at one side of the latter so as to receive the material at the front of the tractor and discharge it at the rear of the latter, driving means between said power take-off shaft and said conveyor, a material lifting fork pivotally mounted in front of the tractor and the conveyor and movable to raised dumping position and lowered gathering position about a horizontal axis extending transversely of the tractor, power operated means for raising said lifting fork to dumping position, a chute carried by said fork and arranged to deliver the material by gravity directly onto the forward end of the conveyor when the fork is raised to dumping position, a vertically yieldable supporting frame for the fork pivotally mounted at its rear end upon the rear of the tractor, said supporting frame having ground engaging runners and vertical posts at its forward end, and vertical members rigid with and rising from the rear of the fork and pivoted to the upper ends of said posts, certain of said vertical members projecting above the pivots thereof, the power operated means for swinging the fork including flexible actuating elements connected to the upper ends of said certain vertical members.

2. In a loading machine, the combination with an agricultural tractor having a rearwardly extending power take-off shaft and a hydraulic lift including vertically movable lifting arms, of an inclined material elevating conveyor mounted upon the tractor longitudinally of and at one side of the latter, said conveyor being arranged to receive the material at the front of the tractor and to discharge it at the rear of the latter and including an endless conveying element passing around a head shaft and a foot shaft, driving connections between said head shaft and the power take-off shaft of the tractor, a material lifting fork pivotally mounted at the front of the tractor and in front of the conveyor for vertical swinging movement about a transverse horizontal axis to raised dumping position and lowered gathering position, means operatively connecting said fork with the lifting arms of the tractor whereby actuation of the said lifting arms will cause raising of the fork to dumping position, and a chute rigid with the fork and arranged to deliver the material by gravity from the latter onto the forward end of the conveyor when the fork is raised to dumping position.

3. The construction defined in claim 2, wherein the tractor includes a differential housing and rear axle housing assembly, in combination with a vertically yieldable supporting frame for the lifting fork including arms arranged longitudinally of the tractor and respectively pivoted at their rear ends on the rear axle housings of said assembly for vertical swinging movement, said fork being pivotally mounted upon the forward end of said supporting frame, and ground engaging runners carried by the forward end of said supporting frame.

4. The construction defined in claim 2, wherein the tractor includes a differential housing and rear axle housing assembly, in combination with a vertically yieldable supporting frame for the lifting fork including arms arranged longitudinally of the tractor and respectively pivoted at their rear ends on the rear axle housings of said assembly for vertical swinging movement, said fork being pivotally mounted upon the forward end of said supporting frame, ground engaging runners carried by the forward end of said supporting frame, and means for guiding said supporting frame in its vertical yielding movement and for restraining the same against lateral movement or strains.

5. In a material loading machine, the combination of a motor vehicle, an elevating conveyor mounted upon the vehicle longitudinally of and at one side of the latter so as to receive the material at the front of the vehicle and discharge it at the rear of the latter, driving means for said conveyor, a material lifting fork pivotally mounted in front of the vehicle and the conveyor and movable to raised dumping position and lowered gathering position about a horizontal axis extending transversely of the vehicle, power operated means for raising said lifting fork to dumping position, a chute carried by said fork and arranged to deliver the material by gravity from the latter onto the forward end of the conveyor when the fork is raised to dumping position, a vertically movable presser roller arranged in the conveyor near the forward end of the latter and above the upper flight of the conveyor element thereof, and operating connections between said roller and the lifting fork for raising said presser roller when the fork is raised to dumping position and for moving the roller downwardly so as to engage the material and press it into tractive engagement with the conveying element of the conveyor when the fork is lowered to gathering position.

WILLIAM C. SHIRK.
JULIUS A. JACOBSON.
RAYMOND C. JACOBSON.
CHARLES H. SHIRK.